3,402,242
NON-IRRITANT QUATERNARY AMMONIUM COMPOUND COMPOSITION

David H. E. Laumann, New York, and Alfred F. Lorman, Brooklyn, N.Y., assignors to Parachlor Chemical Corporation, Brooklyn, N.Y., a corporation of New York
No Drawing. Filed July 20, 1964, Ser. No. 383,955
5 Claims. (Cl. 424—148)

The present invention relates to quaternary ammonium compound compositions in the form of aqueous solutions containing a germicidal quaternary ammonium compound and a small percentage of borax as an anti-irritant the compositions being adapted to be sprayed, discharged or released in a nebulized or mist form to kill pathogenic organisms in an enclosed space and its contents such as a hospital room and the furniture and equipment therein.

It is well recognized that many quaternary ammonium compounds possess germicidal properties, but that they are very irritating to the nose, throat and eyes when sprayed or nebulized in an atmosphere in dilutions of sufficient strength to kill common pathogenic microorganisms in the air and on furniture and equipment surfaces. Tests carried out by us with a number of germicidal quaternary ammonium compounds confirm that they were all irritating and that some were exceedingly irritating.

We further carried out a number of tests to determine whether the irritating properties of germicidally effective quaternary ammonium compounds could be eliminated or drastically reduced. Numerous essential oils, fragrances and compounded fragrances were added but none of them had any particularly beneficial effect and some even enhanced the irritating properties. Several cationic compounds were dispersed in the aqueous germicidal solutions and while some of them resulted in a slight reduction in the irritating properties, they separated out of solution and caused deposition of a tacky film on various surfaces. It will be seen from the foregoing that the addition of agents which might be expected to reduce or minimize the irritating properties of germicidally active aqueous quaternary ammonium solutions did not, in fact, give the desired results. Since these tests were unsuccessful all additives were removed and the problem was attempted to be solved by adding a suitable buffering agent which would raise the pH of the germicidal solution and thereby increase the phenol coefficient or antibacterial effectiveness of the germicide so that it should then be possible to use a smaller amount of the germicidally active quaternary ammonium compound which might have been expected to reduce the irritation factor. It was found, however, that several buffering agents such as caustic soda and soda ash actually increased the irritating properties of the germicidal solutions and, hence, could not be used. The addition of bicarbonate of soda gave a desirable degree of alkalinity but caused a brown discoloration on surfaces, particularly heated surfaces such as radiators. Sodium tripolyphosphate was tried but this not only caused the solution to separate but resulted in a thick curd.

We then made an addition of a small proportion of borax (sodium tetraborate $Na_2B_4O_7$) and discovered that this had highly unexpected and desirable beneficial effects in that an aqueous solution of a germicidally active quaternary ammonium compound such as cetyl trimethyl ammonium bromide could then be nebulized or sprayed into an enclosed space such as a hospital room and all irritating properties were eliminated. This was most surprising and unpredictable and has been found to be unique with respect to borax since other borates which were tried did not give the same results. For example, boric acid and sodium pentaborate failed to provide any anti-irrritant action.

The use of approximately 1%, based on the weight of the solution, of borax, raised the pH of the solution to approximately 9.5, there was no separation of any of the ingredients of the solution or any other undesirable results. When such a solution containing one part of cetyl trimethyl ammonium bromide to 750 parts of water and containing an amount of borax equal to 1% of the weight of the solution was nebulized in a hospital room to such an extent that the entire room became fogged, it was found that the irritating properties of the quaternary ammonium compound were eliminated. A person entering a room containing such nebulized borax-containing quaternary ammonium compound aqueous solution experienced no more annoyance or irritating sensation than would occur upon entering a room which was filled with an ordinary water mist or fog. It was found further to be helpful, although not essential, to add to the aforesaid borax-containing aqueous solution of cetyl trimethyl ammonium bromide 1% of dipropylene glycol and 1% of triethylene glycol. While this solution containing the said glycols gave optimal results and still further improved germicidal action, the omission of these glycols still gives a solution which is completely satisfactory and which can be freely used to disinfect or sterilize hospital rooms and other enclosed spaces which may contain infectious germs.

It is to be understood that other quaternary ammonium compounds which are germicidally active can be employed and that the invention is therefore not limited to the use of cetyl trimethyl ammonium bromide. In general, it has been found that those quaternary ammonium compounds can be used which are water soluble and germicidally active and which correspond to the formula $$R_1R_2R_3R_4NHal$$

wherein Hal is chlorine or bromine, $R_1$ is aralkyl such as benzyl, $R_2$ and $R_3$ are lower alkyl such as methyl, and $R_4$ is higher alkyl ranging from $C_8H_{17}$ to $C_{18}H_{37}$ and mixtures thereof wherein the most active radicals are lauryl, myristyl and cetyl. An example is the well-known benzalkonium chloride which is alkyl dimethyl benzyl ammonium chloride wherein alkyl is higher alkyl and has the above significance. The invention, moreover, is not limited to the use of exactly 1% of borax or to 1 part of quaternary ammonium compound to 750 parts of water since these proportions can be somewhat varied without departing from the invention or losing the benefits of the present discovery.

In general, the amount of borax can range from about 1% to about 5% calculated on the weight of the solution and in the following table the effective amounts of borax for typical quaternary ammonium compounds are set forth.

TABLE

| Quaternary ammonium compound: | Percent borax |
|---|---|
| Alkyldimethylbenzyl ammonium chloride | 1–5 |
| Cetyltrimethyl ammonium bromide | 1 |
| Cetyldimethylethyl ammonium bromide | 1 |
| Decyltrimethyl ammonium bromide | 1–5 |
| Octadecyldimethylbenzyl ammonium chloride | 2–5 |
| Di-isobutylphenoxyethoxyethyldimethylbenzyl ammonium chloride | 1–5 |
| Methyldodecylbenzyltrimethyl ammonium chloride | 2–5 |
| Methyldodecylxylylene bis (trimethyl ammonium chloride) | 2–5 |

In addition the concentration of the quaternary ammonium compound in water can be varied considerably so long as enough of the quaternary ammonium compound is present to obtain effective germicidal action during the fogging which is allowed to remain in the hospital room or enclosure anywhere from about 10 to 30 minutes, following which the room or enclosure is cleared and is ready for re-use or re-occupancy. Depending upon the particular quaternary ammonium compound used, a practical range is about 1 part of such compound to 100 to 10,000 parts of water. The fogging is carried out by means of any suitable nebulizing machine throwing off a very fine spray or mist or can be effected by putting the composition into aerosol pressure containers.

What is claimed is:

1. A quaternary ammonium compound composition which is non-irritant when nebulized consisting of an aqueous solution of a water-soluble, inherently irritating germicidal quaternary ammonium compound in which is incorporated about 1 to 5% of borax based on the weight of the aqueous solution, said borax constituting an anti-irritant agent when the composition is nebulized in an enclosed space.

2. A non-irritant quaternary ammonium compound composition consisting essentially of a solution of cetyl trimethyl ammonium bromide in water in the proportion of about 1 part of cetyl trimethyl ammonium bromide to about 750 parts of water and 1%, by weight of the solution, of borax incorporated in said solution as anti-irritant agent.

3. A composition according to claim 2 additionally containing about 1% of dipropylene glycol and about 1% of triethylene glycol.

4. A method of treating an enclosed space and its contents to kill pathogenic organisms therein which comprises discharging into said enclosed space in nebulized condition a composition consisting of an aqueous solution of a germicidal quaternary ammonium compound which is irritating to nose, throat and eye tissues to which has been added about 1–5% of borax as anti-irritant agent, based on the weight of the solution.

5. A method according to claim 4 in which the quaternary ammonium compound is cetyl trimethyl ammonium bromide and the amount of borax is about 1%.

References Cited

UNITED STATES PATENTS

| | | | |
|---|---|---|---|
| 2,541,248 | 2/1951 | Hibbs | 167—30 |
| 2,676,986 | 4/1954 | Wakerman | 167—22 |
| 3,160,555 | 12/1964 | Hamill | 167—90 |

FOREIGN PATENTS 700,115  11/1953  Great Britain.

OTHER REFERENCES

Hackh, Chemical Dictionary, The Blakiston Company, Philadelphia, third edition, 1944, p. 138.

Schwartz, Surface Active Agents and Detergents, Interscience Publishers, Inc., New York, N.Y., vol. II, 1958, pp. 235, 236.

The Merck Index of Chemicals and Drugs, Merck and Co., Inc., Rahway, N.J., 1960, pp. 130, 425.

ALBERT T. MEYERS, *Primary Examiner.*

J. D. GOLDBERG, *Assistant Examiner.*